(12) United States Patent
Shawver et al.

(10) Patent No.: US 7,606,833 B2
(45) Date of Patent: Oct. 20, 2009

(54) SYSTEM AND METHOD FOR USING AN RMI ACTIVATION SYSTEM DAEMON WITH NON-JAVA APPLICATIONS

(75) Inventors: Matthew A. Shawver, Kaneohe, HI (US); Jos Martin, Burwell (GB)

(73) Assignee: The MathWorks, Inc., Natick, MA (US)

( * ) Notice: Subject to any disclaimer, the term of this patent is extended or adjusted under 35 U.S.C. 154(b) by 331 days.

(21) Appl. No.: 11/102,090

(22) Filed: Apr. 8, 2005

(65) Prior Publication Data

US 2006/0242223 A1     Oct. 26, 2006

(51) Int. Cl.
  G06F 7/00 (2006.01)
  G06F 17/00 (2006.01)
  G06F 9/44 (2006.01)
  G06F 3/00 (2006.01)
  G06F 9/46 (2006.01)
  G06F 13/00 (2006.01)

(52) U.S. Cl. ............... 707/104.1; 717/114; 719/330
(58) Field of Classification Search ............ 717/114; 719/330; 707/104.1
See application file for complete search history.

(56) References Cited

U.S. PATENT DOCUMENTS

| | | | |
|---|---|---|---|
| 6,185,609 B1 * | 2/2001 | Rangarajan et al. | 709/219 |
| 6,999,607 B2 * | 2/2006 | Kiros et al. | 382/128 |
| 7,158,973 B2 * | 1/2007 | Mandal et al. | 707/10 |
| 7,437,740 B1 * | 10/2008 | Koerber et al. | 719/330 |
| 7,444,619 B2 * | 10/2008 | McManus | 717/114 |

OTHER PUBLICATIONS

Doyle, Edward, "CORBA Wrap Interface," 1999, ACM, pp. 1-7.*
Newmarch, Jan et al., "A Service Architecture for Scalable Distributed Audio," 2004, pp. 1-11.*
Chiang, Chia-Chu, "Wrapping legacy systems for use in heterogeneous computing environments," *Information and Software Technology*, vol. 43:497-507 (2001).
"Java Remote Method Invocation—Distributed Computing for Java," White Paper retrieved online at: http://web.archive.org/web/20040427111947/http://java.sun.com/products/jdk/rmi/reference/whitepapers/javarmi.html (2006).
"Java Remove Method Invocation," Java Remove Method Invocation Specification, (1998).
International Search Report for Application No. PCT/US2006/013676, dated Sep. 22, 2006.
Husbands, Parry Jones Reginald, "Interactive Supercomputing," pp. 1-96 (1999).

* cited by examiner

*Primary Examiner*—James Trujillo
*Assistant Examiner*—Jorge A Casanova
(74) *Attorney, Agent, or Firm*—Lahive & Cockfield, LLP; Kevin J. Canning

(57) ABSTRACT

An RMI (Remote Method Invocation) service framework that enables a non-JAVA application to be managed by an RMI activation system daemon is disclosed. The present invention enables the non-JAVA application to communicate with other JAVA applications that make use of RMI following a registration process. Additionally, because the non-JAVA application is managed by the RMI activation system daemon, the non-JAVA application displays a high degree of persistence and/or reliability ordinarily associated with RMI services. As a result, non-JAVA applications may be used to perform distributed and parallel computing tasks in a more efficient manner than is possible with conventional methods.

22 Claims, 4 Drawing Sheets

SYSTEM AND METHOD FOR USING AN RMI ACTIVATION SYSTEM DAEMON WITH NON-JAVA APPLICATIONS

FIELD OF THE INVENTION

The illustrative embodiment of the present invention relates generally to the use of RMI (Remote Method Invocation) and more particularly to the registration and use of a non-JAVA application with an RMI activation system daemon.

BACKGROUND

RMI is a set of protocols developed by Sun Microsystems, Inc. of Palo Alto, Calif. which enable JAVA objects (based on the JAVA programming language developed by Sun Microsystems, Inc.) to communicate remotely. The use of RMI allows for distributed computing in which the processing being performed by an application may be divided between a client and one or more servers. The RMI services being invoked are managed by an RMI activation system daemon such as RMID or Phoenix. RMID is the RMI activation system daemon from Sun Microsystems, Inc. (started by the 'rmid' command) that allows objects to be registered and activated in a JAVA Virtual Machine (JVM). Phoenix is a distributed network framework developed by Intel Corporation of Santa Clara, Calif. that is backwards compatible with RMID and may be used to support the RMI service framework discussed herein. The RMI activation system daemon provides persistence to the RMI services by managing the process in which the RMI service runs. In the event of session failure, the RMI activation system daemon is able to reinitiate the RMI service to limit any interruption in service being provided to the client.

Unfortunately, the RMI activation system daemon uses a number of mechanisms which are JAVA-based. While this allows the RMI services being managed by the RMI activation system daemon to communicate with each other using well-understood JAVA mechanisms, the use of the JAVA mechanisms presents a problem in integration with non-JAVA applications. Conventionally, there is not an available mechanism by which non-JAVA applications may be integrated into a service framework such that it can be managed by the RMI activation system daemon.

BRIEF SUMMARY

The illustrative embodiment of the present invention enables a non-JAVA application to be managed by an RMI activation system daemon. The present invention enables the non-JAVA application to communicate with other JAVA applications that make use of RMI following a registration process. Additionally, because the non-JAVA application is managed by the RMI activation system daemon, the non-JAVA application displays a high degree of persistence and/or reliability ordinarily associated with RMI services. As a result, non-JAVA applications may be used to perform distributed and parallel computing tasks in a more efficient manner than is possible with conventional methods.

In one embodiment, in a network including RMI services, a method includes the step of providing a configuration file which is processed by an RMI activation system daemon. The configuration file identifies at least one non-JAVA application. The method further includes the step of starting a JVM inside the identified non-JAVA application. Additionally, the method includes the step of registering the non-JAVA application with the RMI activation system daemon as part of a start up sequence for the non-JAVA application.

In another embodiment, a system in a network providing RMI services includes a configuration file processed by an RMI activation system daemon. The configuration file identifies at least one non-JAVA application. The system further includes a JVM which executes inside the identified non-JAVA application. The non-JAVA application is configured to accept RMI calls via a JNI (JAVA Native Interface). The system additionally includes an RMI activation system daemon which accepts a registration from a non-JAVA application as part of a start up sequence for the non-JAVA application.

In an embodiment, in a network including remotely accessible services, a method includes the step of providing a framework for managing distributed server processes written in a first programming language. The method also includes the step of providing a configuration file processed by a system daemon. The configuration file identifies an application written in a second programming language, the second programming language being different from the first programming language. The method additionally includes the step of integrating the application into the framework using the system daemon to register the application with the framework as part of a startup sequence for the application.

DETAILED DESCRIPTION

The illustrative embodiment of the present invention allows non-JAVA applications to mimic a JAVA application so as to be managed by an RMI activation system daemon. Once registered the non-JAVA application is able to be integrated with JAVA applications. The use of the RMI activation system daemon also provides a well-understood mechanism to increase the persistence and reliability of the non-JAVA application during distributed computing and parallel computing tasks.

Figure 1:
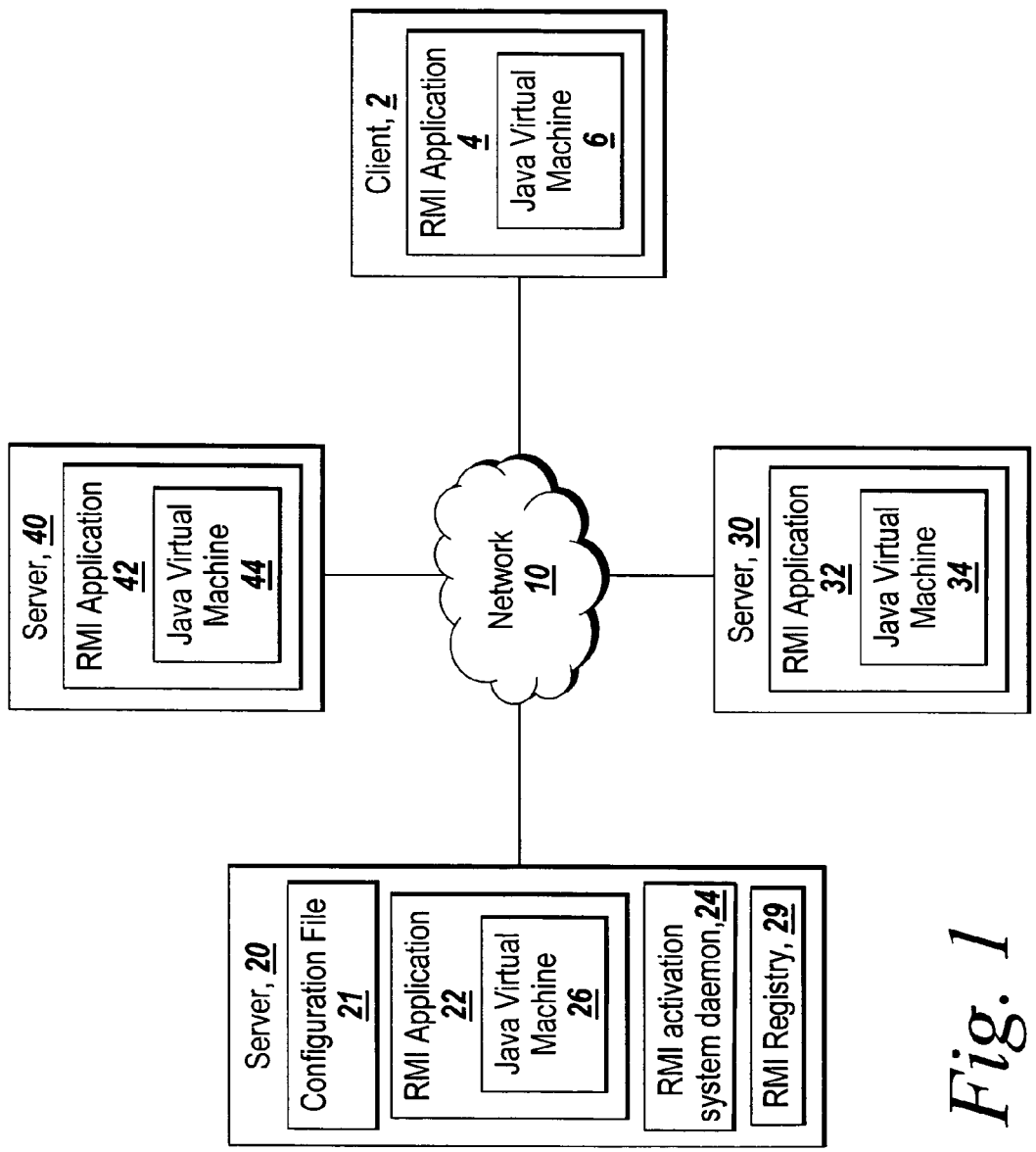
FIG. 1 (Prior Art) depicts a conventional distributed computing environment utilizing RMI services and managed by an RMI activation system daemon.

FIG. 1 (Prior art) depicts a conventional homogenous RMI service environment. A client 2 communicates over a network 10 with servers 20, 30 and 40. The client 2 includes an RMI application 4 and a JVM 6 utilized by the RMI application to communicate with an RMI application 22 located on server 20. Server 20 also includes a configuration file 21 and a JVM 26 generated by RMI application 22. Server 20 additionally includes an RMI activation system daemon 24 and an RMI registry 29. In a conventional environment, the RMI activation system daemon 24 processes information from the configuration file 21 and identifies an RMI application 22 to be executed. The RMI activation system daemon 24 proceeds through the conventional start-up sequence for the RMI application 22 and registers the RMI application in the RMI registry 29. The conventional RMI start-up sequence is discussed in detail below. The RMI application 22 communicates over the network 10 with the client portion of the RMI application 4 located on the client 2. The RMI application 22 may not be located entirely on server 20 but rather may be segmented and distributed as RMI application 32 and RMI application 42 located on servers 30 and 40 respectively. The RMI activation system daemon 24 may manage parallel computing tasks being performed by RMI applications 22, 32, and 42. Each RMI application 22, 32 and 42 generates a JVM 26, 34, and 44 which is used to communicate with the other server hosted JAVA applications and with RMI application 4 located on the client 2.

The RMI activation system daemon 24 manages the distributed and/or parallel computing being performed by the RMI application 4, 22, 32, and 42. In the event of service interruption, the RMI activation system daemon 24 is responsible for re-initiating the interrupted RMI application 4, 22, 32, or 42. The ability of the RMI activation system daemon 24 to re-activate an interrupted RMI application 4, 22, 32, or 42 provides persistence and reliability to the RMI execution environment. The RMI communication methods used by the RMI applications 22, 32, 42, and 4 are all JAVA-based. The JAVA-based methods present an obstacle to the integration of non-JAVA applications into the RMI service framework.

Figure 2:
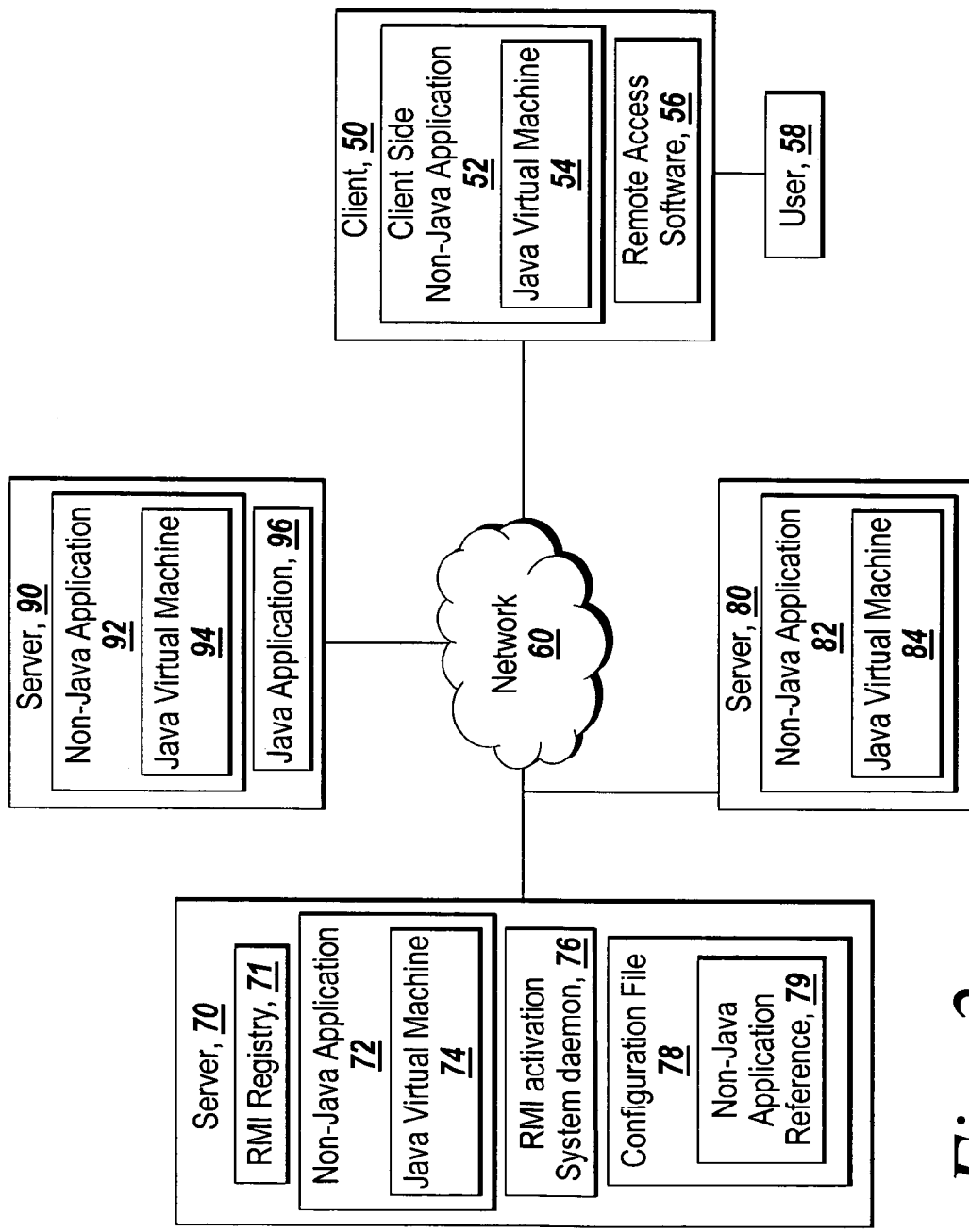
FIG. 2 depicts an environment suitable for practicing the illustrative embodiment of the present invention.

The illustrative embodiment of the present invention addresses the obstacles posed by the reliance on JAVA in the RMI service framework. FIG. 2 depicts an environment suitable for practicing the illustrative embodiment of the present invention to integrate a non-JAVA application into the RMI service framework. A user 58 accesses a client 50 communicating over a network 60. The network 60 may be a Local Area Network (LAN), a Wide Area Network (WAN), an intranet, an internet, the Internet, or some other type of network. A client 50 will include the client side of a non-JAVA application 52. As will be explained further below, the non-JAVA application 52 in the present invention generates a JVM for RMI communication with the RMI activation system daemon 76 and other JAVA applications. Alternatively, the client 50 may hold remote access software 56 enabling the user 58 to log onto a session running on a remote server 70, 80 and 90 and access a non-JAVA application located on one of those servers practicing the illustrative embodiment of the present invention. Although the terms client and server have been utilized herein to identify the devices communicating over the network 60, those skilled in the art will recognize that a multitude of different electronic devices equipped with processors may be utilized in the present invention. Thus, the client and servers may include laptops, work stations, stand alone servers, blade servers, mainframe computers, PDAs, and other network devices capable of performing the operations described herein. The client side non-JAVA application 52 communicates over the network 60 with one or more servers 70, 80, and 90.

Similarly, those skilled in the art will recognize that many different network architectures are possible within the scope of the present invention. For example, the servers 70, 80 and 90 might all be arranged in a server farm connected to Wide Area Network. Alternatively, the servers 70, 80 and 90 may all be located on different local area networks.

The server 70 includes a non-JAVA application 72 configured in a manner consistent with the present invention described herein. The non-JAVA application may be a C/C++-based application such as a MATLAB-based application (MATLAB is software produced from the MathWorks, Inc. of Natick, Mass.). Alternatively, those skilled in the art will recognize that the non-JAVA application 72 may be an application other than a MATLAB-based application such as an application written in C, C++ or some other programming language other than JAVA without departing from the scope of the present invention.

The non-JAVA application 72 generates a JVM 74 utilized by the non-JAVA application 72 to communicate in the RMI service framework. The server 70 also includes an RMI registry 71, an RMI activation system daemon 76 and an altered configuration file 78 which includes a reference 79 to the non-JAVA application. The alteration of the configuration file 78 for the practicing of the illustrative embodiment of the present invention is discussed further below. The non-JAVA application 72 may be segmented in a manner to allow parallel computing tasks to be performed. Accordingly, the server 80 may include non-JAVA application 82 generating JVM 84, and server 90 may include non-JAVA application 92 generating JVM 94. Server 90 may also include JAVA application 96. The illustrative embodiment of the present invention enables the non-JAVA application 72 to communicate using RMI with the JAVA application 96. Those skilled in the art will recognize that there may be more than one JAVA application 96 communicating over the network 60 with which the non-JAVA application 72 may communicate.

Figure 3:
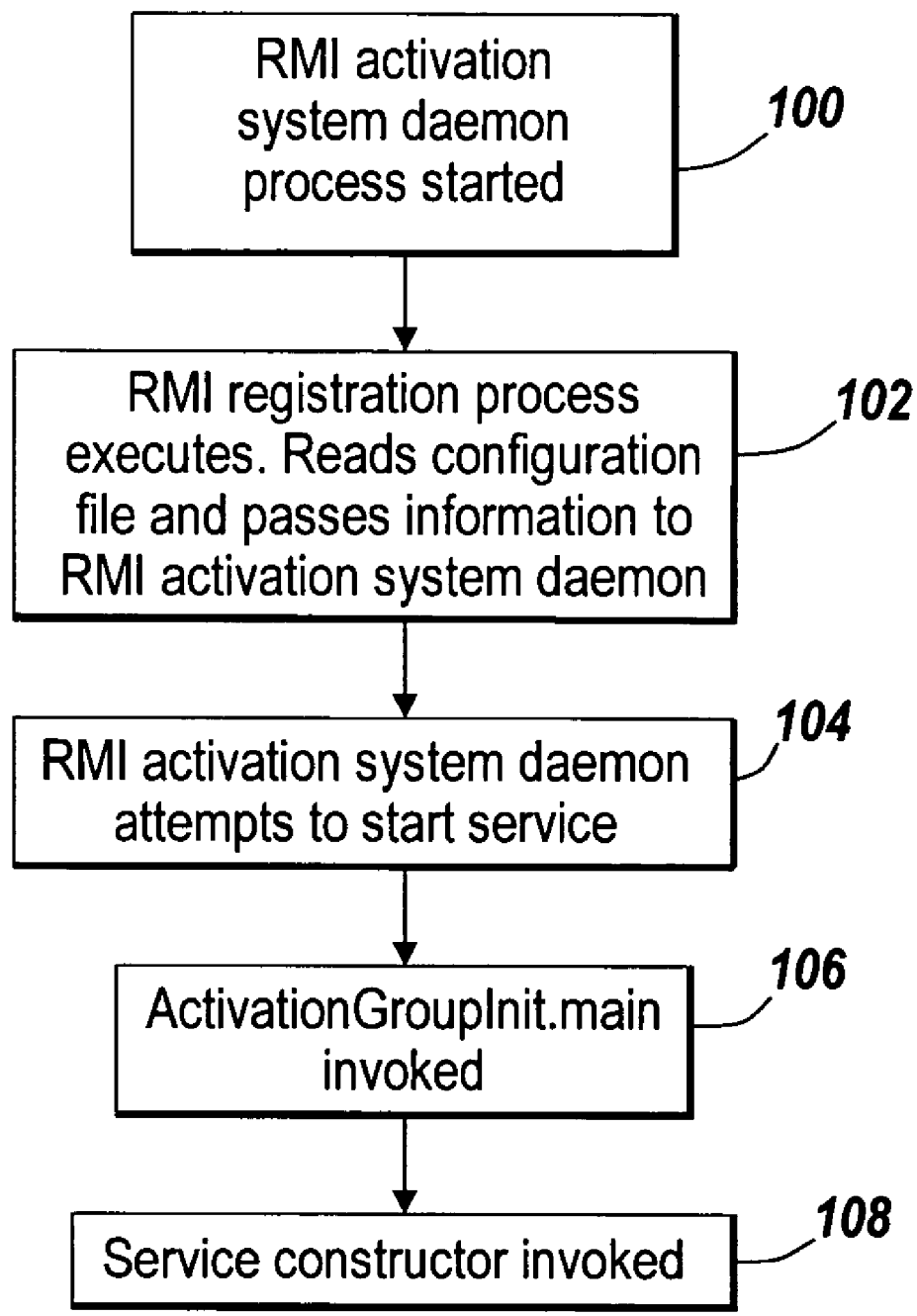
FIG. 3 (Prior Art) is a flow chart of the sequence of steps followed by a conventional RMI flow chart environment.

Prior to discussing the alterations in the conventional RMI framework performed by the present invention, it may be helpful to discuss the process ordinarily engaged in by the RMI activation system daemon 24 in a conventional system. The conventional sequence of RMI registration events is outlined in the flow chart of FIG. 3 (prior art). The sequence begins with the activation of the RMI activation system daemon 24, typically by the system administrator (step 100). The RMI registration process then executes by processing the information in the configuration file (step 102). The RMI registration process includes multiple steps in which a JAVA process reads from a registration file and registers selected information. The information read by the JAVA process and subsequently passed to the RMI activation system daemon 24 includes the location of the JAVA executable or application that is to be started. The selected information also includes the JAVA options that should be passed to the JAVA executable. Additionally, the RMI registration process identifies the classpath that needs to be passed to the JAVA executable as well as the service class that should be started.

The sequence continues with the RMI activation system daemon 24 attempting to start the service that was identified in the configuration file (step 104). The RMI activation system daemon 24 then invokes ActivationGroupInit.main (step 106). ActiviationGroupInit.main starts the virtual machine executing an activation group. The invoking of ActivationGroupInit.main reads the activation group ID and the activation group description from STDIN (the designated input path). The group ID identifies the process that is being started and the group description gets information from the activation process describing which service class should be started. The invoking of ActivationGroupInit.main also invokes the constructor of the class that is given in the group description. The RMI activation system daemon 24 then invokes the identified service constructor which was previously identified (step 108). The invoking of the service constructor, if successful, completes the activation sequence. If the service process should happen to terminate unexpectedly, the RMI activation system daemon 24 re-initiates the sequence of steps with the reading of the configuration file in order to provide uninterrupted service.

Figure 4:
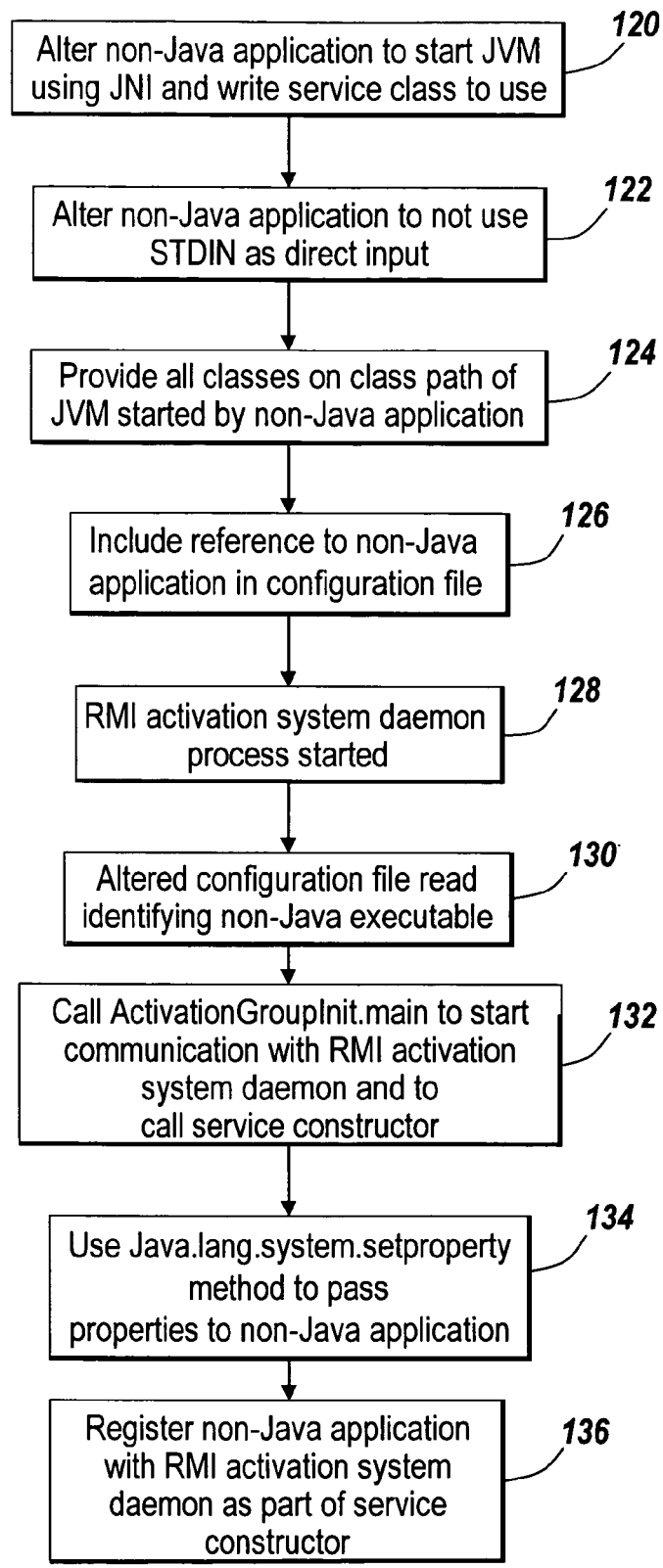
FIG. 4 is a flow chart of the sequence of steps followed by the illustrative embodiment of the present invention to integrate a non-JAVA application into an RMI service framework.

In order to integrate non-JAVA applications into this JAVA-based service framework, a number of changes to the conventional RMI framework are required. FIG. 4 depicts the sequence of steps necessary to alter the traditional RMI service mechanisms to enable a non-JAVA application to be integrated with the RMI service framework. The sequence of steps begins with the alteration of the non-JAVA application 72 so that a JVM will be automatically initiated inside the non-JAVA application during start up using JNI (JAVA Native Interface) (step 120). A JNI is an API that allows developers to access the languages of a host system and determine the way JAVA integrates with native code. The non-JAVA application 72 is also altered so that it does not automatically read from STDIN as direct input (step 122). The RMI activation system daemon will attempt to send JAVA commands to STDIN. If the non-JAVA application does not disable reading from STDIN, the JAVA-formatted commands received by the non-JAVA application will cause errors. An additional alteration requires that all the classes required by the non-JAVA application be located on the classpath of the JAVA machine being initiated by the non-JAVA application (step 124). This step is necessitated by the fact that many non-JAVA applications do not accept a—classpath command line flag as an input parameter. The sequence then alters the configuration file by including a reference 79 to the non-JAVA application 72 rather than a reference to a java executable (step 126).

The sequence of steps followed by the illustrative embodiment of the present invention continues with the normal RMI activation system daemon 76 process being started by a system administrator or other authorized user (step 128) and the altered configuration file being read to identify the non-JAVA executable (step 130). As part of the non-JAVA application start up sequence, ActivationGroupInit.main is called to start communication with the RMI activation system daemon 76 and call the necessary service constructor (step 132). The properties passed to STDIN such as the codebase property 30, security manager property, etc. are read from STDIN but then passed to the Java.lang.System.setProperty method rather than the non-JAVA application (step 134). The service constructor for the non-JAVA application then registers the non-JAVA application with the RMI activation system daemon 76 as part of the call to the service constructor (step 136). As a result, the non-JAVA application is registered in the RMI registry 71. The JVM generated by the non-JAVA application is then used to communicate with the other RMI services registered by the RMI activation system daemon 76.

As previously noted, all RMI calls are delegated to the non-JAVA application via the JNI associated with the non-JAVA application. Because the non-JAVA application has registered with the RMI activation system daemon 76, the RMI activation system daemon is able to provide a degree of persistence. It enables the non-JAVA application utilizing the illustrative embodiment of the present invention to perform more robust parallel computing tasks and perform distributed computing with a higher degree of confidence and reliability for the user.

In one aspect of the present invention, the illustrative embodiment of the present invention may be used to control communications for processes performing distributed technical computing such as that performed by MATLAB software utilizing the DISTRIBUTED COMPUTING TOOLBOX both from the MathWorks, Inc. of Natick, Mass. In distributed computing, technical computing tasks are distributed from a technical computing client to remote technical computing workers for execution of the tasks on multiple computer systems. Tasks can be declared on a technical computing client and additionally organized into jobs. A job is a logical unit of activities, or tasks that are processed and/or managed collectively. A task defines a technical computing command, such as a MATLAB software command, to be executed, and the number of arguments and any input data to the arguments. A job is a group of one or more tasks. The task can be directly distributed by the technical computing client to one or more technical computing workers. A technical computing worker performs technical computing on a task and may return a result to the technical computing client.

Additionally in distributed computing, a task or a group of tasks, in a job, can be submitted to an automatic task distribution mechanism to distribute the one or more tasks automatically to one or more technical computing workers providing technical computing services. The technical computing client does not need to specify or have knowledge of the technical computing workers in order for the task to be distributed to and computed by a technical computing worker. The automatic task distribution mechanism can distribute tasks to technical computing workers that are anonymous to any technical computing clients. The technical computing workers perform the task and may return as a result the output data generated from the execution of the task. The result may be returned to the automatic task distribution mechanism, which, in turn, may provide the result to the technical computing client. The RMI activation system daemon 76 may be used to initiate the job manager which distributes and monitors the distributed tasks.

The present invention may be provided as one or more computer-readable programs embodied on or in one or more mediums. The mediums may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include C, C++, C#, or JAVA. The software programs may be stored on or in one or more mediums as object code.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. In a network including a remote invocation service system supporting a first programming language, the remote invocation service system including a remote invocation service activation system daemon and a remote invocation service registry, a method comprising:

providing a configuration file that is processed by the remote invocation service activation system daemon, the remote invocation service activation system daemon providing persistence to a plurality of remote invocation services, the configuration file identifying at least one non-native application implemented in a second programming language, the second programming language being a programming language not supported by the remote invocation service system;

as part of a startup sequence executed by the identified non-native application when the identified non-native application is started, starting a virtual machine for the first programming language inside the identified non-native application;

configuring the identified non-native application so that incoming remote invocation service calls are delegated to the identified non-native application via a programming interface that enables code written in the first programming language running in the virtual machine to integrate with native applications; and registering the identified non-native application in the remote invocation service registry with the remote invocation service activation system daemon as part of the startup sequence for the identified non-native application.

2. The method of claim 1, whereby the identified non-native application sets a property passed to the identified non-native application and reads from STDIN with a method written in the first programming language.

3. The method of claim 1, wherein the remote invocation service activation system daemon enables objects to be registered and activated in a virtual machine for the first programming language.

4. The method of claim 1, further comprising:
establishing at least one remote session performing a task for the identified non-native application, the remote session managed with the remote invocation service activation system daemon.

5. The method of claim 4, further comprising:
detecting a break in the remote session; and
re-establishing the remote session at the point of the break using the remote invocation service activation system daemon.

6. The method of claim 1, wherein the identified non-native application communicates with other applications implemented in the first programming language using remote invocation service.

7. The method of claim 1, wherein the second programming language is one of C and C++.

8. The method of claim 1, wherein the identified non-native application is used in distributed technical computing.

9. A system in a network providing remote invocation services supporting a first programming language, the system comprising:
a remote invocation service activation system daemon, the remote invocation service activation system daemon providing persistence to a plurality of remote invocation services;
a non-native application implemented in a second programming language, the second programming language being a programming language not supported by the remote invocation services, the non-native application including a startup sequence that is executed by the non-native application when the non-native application is started;
a configuration file that is processed by the remote invocation service activation system daemon, the configuration file identifying the non-native application implemented in the second programming language;
a virtual machine for the first programming language, the virtual machine started as part of the startup sequence of the identified non-native application and executed inside the identified non-native application, the identified non-native application configured to accept remote invocation service calls via a programming interface that enables code written in the first programming language to integrate with native applications; and
a remote invocation service registry, the remote invocation service activation system daemon registering the identified non-native application in the remote invocation service registry as part of the startup sequence for the identified non-native application.

10. The system of claim 9, wherein the remote invocation service activation system daemon detects a break in a remote session performing a task for the identified non-native application and reestablishes the remote session at the point of the break.

11. The system of claim 9, wherein the remote invocation service activation system daemon enables objects to be registered and activated in a virtual machine for the first programming language.

12. The system of claim 9 wherein the remote invocation service activation system daemon manages at least one remote session.

13. One or more computer-readable media holding computer-executable instructions for providing remote invocation services supporting a first programming language, the media holding one or more instructions for:
providing a configuration file that is processed by a remote invocation service activation system daemon, the remote invocation service activation system daemon providing persistence to a plurality of remote invocation services, the configuration file identifying at least one non-native application implemented in a second programming language, the second programming language being a programming language not supported by the remote invocation services;
as part of a startup sequence executed by the identified non-native application when the identified non-native application is started, starting a virtual machine for the first programming language inside the identified non-native application;
configuring the identified non-native application to accept remote invocation service calls via a programming interface that enables code written in the first programming language running in the virtual machine to integrate with native applications;
registering the identified non-native application in an remote invocation service registry with the remote invocation service activation system daemon as part of the startup sequence for the identified non-native application.

14. The media of claim 13, wherein the remote invocation service activation system daemon enables objects to be registered and activated in a virtual machine for the first programming language.

15. The media of claim 13, wherein the media holds one or more instructions for:
at least one remote session performing a task for the identified non-native application, the remote session managed with the remote invocation service activation system daemon.

16. The media of claim 15, wherein the media holds one or more instructions for:
detecting a break in the remote session; and
establishing the remote session at the point of the break using the remote invocation service activation system daemon.

17. The media of claim 13, wherein the identified non-native application implemented in the second programming language communicates with other applications implemented in the first programming language using remote invocation service.

18. The media of claim 13, wherein the second programming language is one of C and C++.

19. The media of claim 13, wherein the identified non-native application is used in distributed technical computing.

20. In a network including remotely accessible services, a method comprising:
providing a framework for managing distributed server processes written in a first programming language;

providing a configuration file in a service registry that is processed by a system daemon that is part of the framework, the system daemon providing persistence to a plurality of services, the configuration file identifying a non-native application written in a second programming language, the second programming language different from the first programming language; and integrating the non-native application into the framework using the system daemon to register the non-native application with the framework as part of a startup sequence executed by the non-native application.

21. The method of claim 20, further comprising:

establishing at least one remote session performing a task for the non-native application, the remote session managed with the system daemon.

22. The method of claim 21, further comprising:

detecting a break in the remote session; and re-establishing the remote session at the point of the break using the system daemon.

* * * * *